Jan. 6, 1948.  L. P. EVANS ET AL  2,434,202
METHOD AND APPARATUS FOR CONTACTING GASES WITH
PARTICLE FORM SOLID CONTACT MATERIALS
Filed April 1, 1944  3 Sheets-Sheet 1
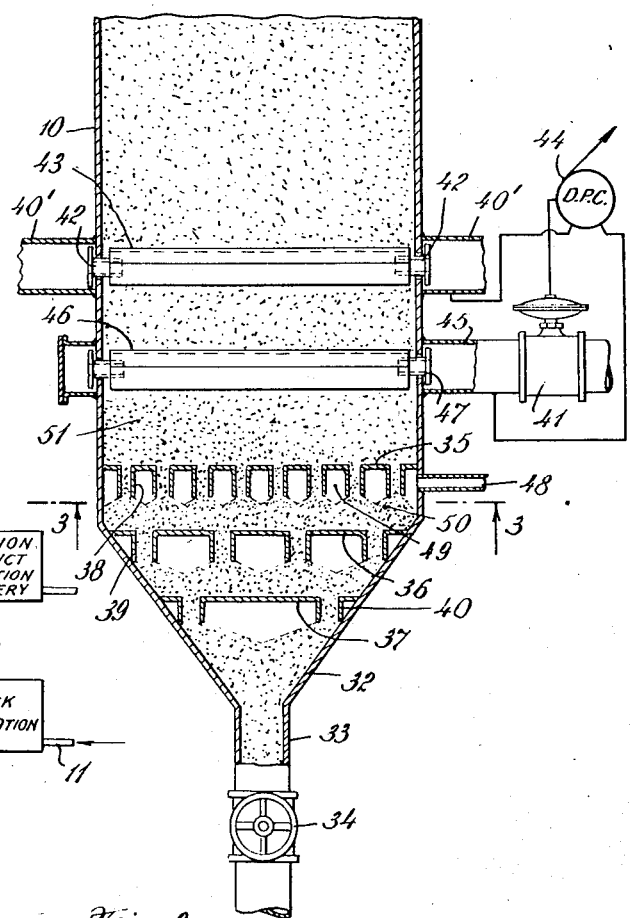
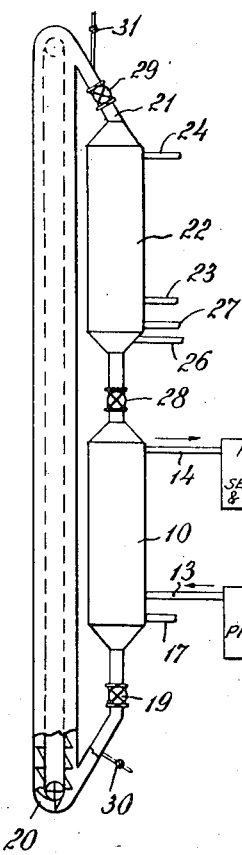
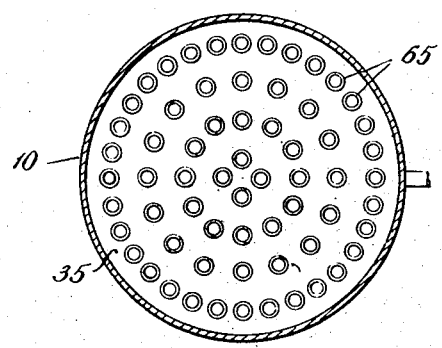
Louis P. Evans
Charles V. Hornberg
Frederick E. Ray
INVENTORS
BY
ATTORNEY

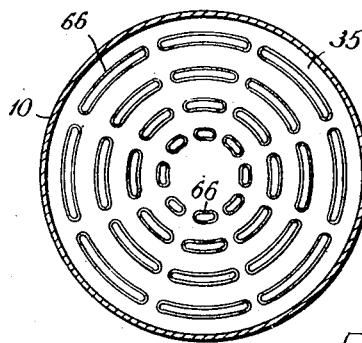
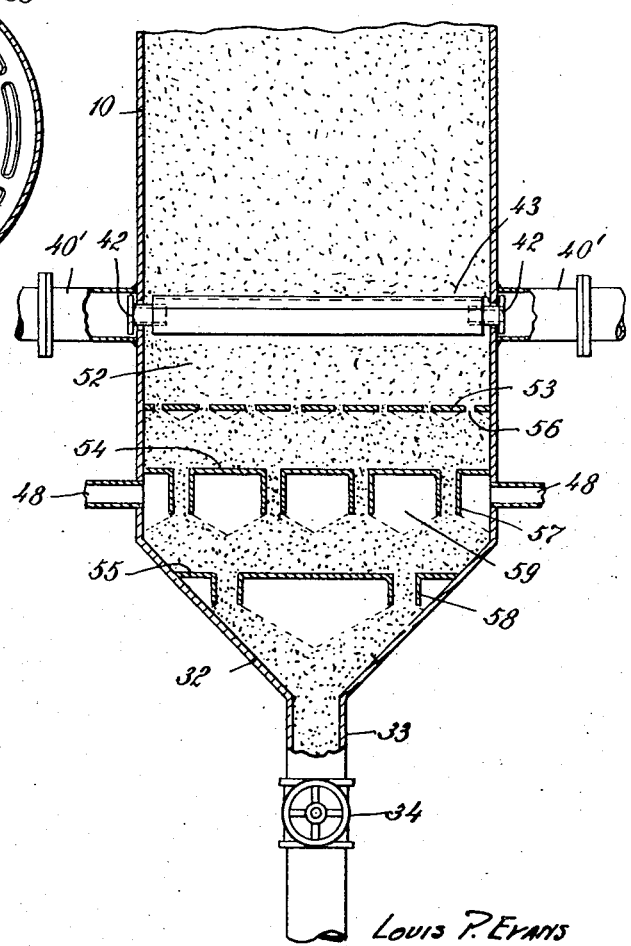

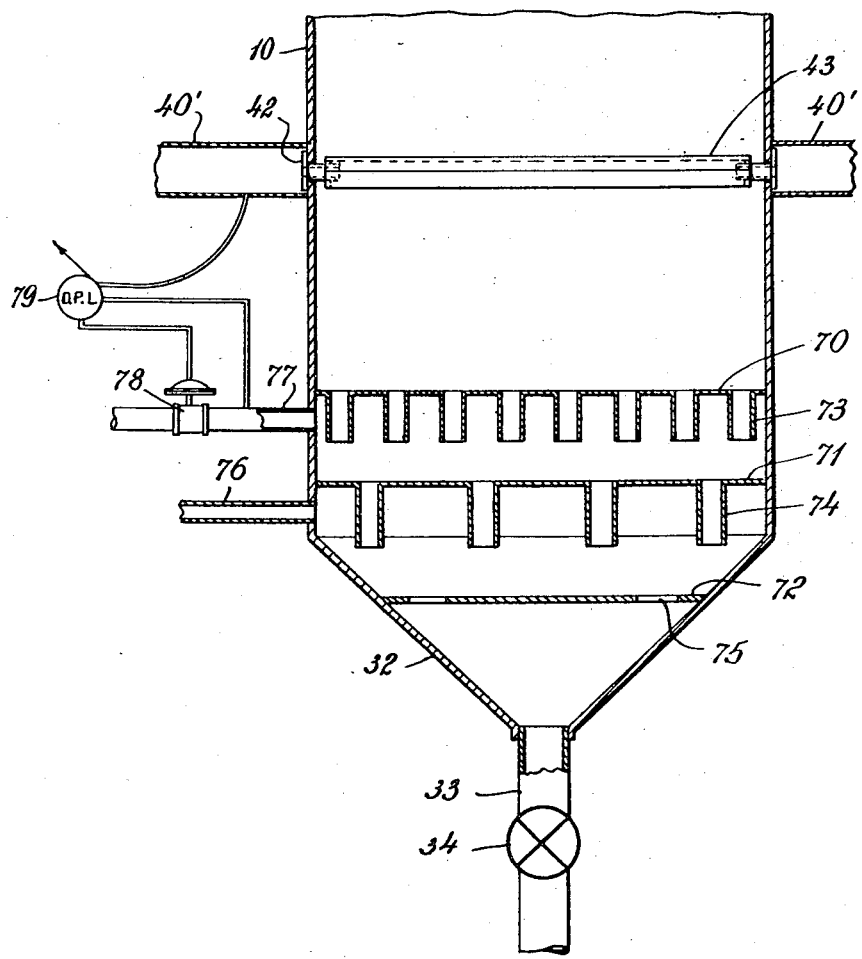

Patented Jan. 6, 1948

2,434,202

UNITED STATES PATENT OFFICE 2,434,202

METHOD AND APPARATUS FOR CONTACTING GASES WITH PARTICLE FORM SOLID CONTACT MATERIALS

Louis P. Evans, Woodbury, Charles V. Hornberg, Wenonah, and Frederick E. Ray, Mantua, N. J., assignors to Socony-Vacuum Oil Company, Incorporated, a corporation of New York Application April 1, 1944, Serial No. 529,080

21 Claims. (Cl. 196—52)

This invention has to do with methods and apparatus for contacting gases with particle form solid contact materials for purposes of gaseous reactions, gaseous-solid reactions, gaseous-solid heat exchange or any of a number of other purposes. Exemplary of the processes of this kind is the cracking conversion of relatively high boiling point hydrocarbons to gasoline and other products at suitable conditions of temperature and pressure in the presence of a particle form solid adsorptive catalytic contact mass material. Such contact material may take the form of natural or treated clays and/or various associations of silica and alumina, either natural or synthetic, various carrier materials containing added materials such as metallic oxides and other adsorptive materials. In a most recent form this operation has been developed as one in which the particle form solid contact mass material is moved cyclically through two zones in the first of which it is subjected to reaction and in the second of which it is subjected to the action of a fluid regeneration medium, such as a combustion supporting gas, acting to burn off contaminant materials deposited upon the contact mass during reaction.

This invention has specifically to do with processes and apparatus for conduct of such processes wherein gases are contacted with a column of flowing particle form contact mass material.

A major object of this invention is the provision of a method and apparatus in such a process as above described wherein all portions of a column of flowing particle form solid contact mass material may be equally and uniformly contacted with gaseous materials and wherein said gaseous materials may be uniformly introduced across the entire cross section of said column of contact mass material.

A specific object of this invention is the provision in such a process as above described of a method and apparatus wherein all portions of a column of flowing particle form contact mass material may be equally and uniformly contacted with gasiform reactants and wherein said contact mass material may be purged substantially free of said gasiform reactants before its withdrawal from the reaction zone.

A further object is the provision of a method and apparatus for accomplishing the above object which permits a substantial reduction in the size and cost of the apparatus required therefor.

These and other objects of this invention will become apparent in the following description of this invention.

The successful operation of processes involving continuous flow of particle form contact mass material as in the cracking and regeneration steps of the continuous conversion processes outlined above, requires that the rate of flow of the contact material be uniform throughout the reaction zones of these vessels. When granular material is discharged from the base of a vessel through an outlet of relatively small size compared with the vessel, the velocity of flow will vary widely across a horizontal cross-section of the vessel and will be greatest directly above the outlet. This difference in velocity decreases at higher levels in the vessel, but equal velocity and even flow is never obtained in a large vessel if its cross-sectional area is much greater than that of the outlet.

A novel method and apparatus for overcoming this difficulty is the subject of United States Patent No. 2,412,136 to Evans et al., dated December 3, 1946, of which two of the present applicants are the joint inventors.

In that application a method and apparatus is described wherein a series of superposed partitions are provided adjacent the lower end of a reaction vessel and a progressively decreasing number of properly distributed orifices or downwardly depending conduits are provided in each successive partition. Contact material is thus withdrawn from the bottom of a column of said material flowing through the reaction vessel in a plurality of properly distributed streams through said uppermost partition and directed onto an accumulation of said contact material over the next partition below. The process is serially repeated, each time withdrawing a smaller number of properly distributed streams from an accumulation of contact material thereabove, and finally a relatively small number of said streams are combined into a single discharge stream which flows from the reaction vessel through a single discharge conduit.

It is also of considerable importance in many processes involving contacting of gasiform reactants with columns of flowing particle form contact mass material, that the reactant vapors be purged from the contact material before its removal from the reaction vessel. It will readily be seen that this is of great importance in processes wherein the gasiform reactant is combustible or readily oxidizable and the contact material is withdrawn from the reaction vessel at high temperatures into combustion or oxidation supporting atmospheres or in processes involving two or more conversion vessels in a cyclic system wherein entirely different reactants are used, such as for example, air in a regenerator and hydrocarbon gases in a reactor.

Heretofore, in order to remove reactants from the contact material before its withdrawal from the reaction vessel in such processes, it was necessary to provide a separate external purge section or a purge section in the bottom section of the reaction vessel below the reaction zone. Inert purge gas was introduced to this purge section through a plurality of distributing channels or through other suitable distributing means and caused to flow upwardly through a section of the column of contact material below the reaction zone.

In a reaction vessel in which the means for contact material flow equalization described in the above mentioned Patent No. 2,412,136 was used, the purge section might be inserted in the reaction vessel above said flow equalization means and below said reaction zone. Moreover it was found necessary for the equal purging of all portions of the contact material across the entire column cross-section with fresh inlet purge gas and for proper operation of the contact material flow equalization means to space said inlet purge gas distributing channels or means at least a short distance above said flow equalization means.

It has now been discovered that said additional purge gas inlet distribution channels may be entirely eliminated by introduction of said inert gas into a space or spaces provided under one or more properly designed contact material flow equalization partitions and then flowing the inert gas from said space or spaces upwardly, through the a uniformly distributed plurality of contact material streams flowing through said partition or partitions, into the bottom of the contact material column thereabove and upwardly through a short length of said column below the reaction zone. By this method and apparatus, not only is a substantial saving in required length of reaction vessel accomplished and the elimination of somewhat costly additional purge inlet gas distribution means, but also a more efficient means of purging the reactant gases from the contact material is provided.

For a better understanding of this invention reference should now be made to the drawings attached hereto of which Figure 1 is a highly diagrammatic showing of the entire cyclic setup used for accomplishing a gaseous conversion in the presence of a moving column of particle form contact mass material, Figure 2 is an elevational view, partially in section, of one form of the apparatus of this invention and Figure 3 is a cross-sectional view taken at line 3—3 of Figure 2 and Figure 4 is a cross-sectional view taken at the same level when an alternate form of partition is used therein. Figure 5 is a vertical section of a modified form of this apparatus. Figure 6 is a vertical section of still another modified form of this apparatus. All of the above drawings are diagrammatic in form.

Turning now to Figure 1, this figure shows in highly diagrammatic form a setup of apparatus in which the invention may be practiced. This apparatus consists of a reaction chamber 10 through which there is moved as a moving column a flowing stream of particle-form solid contact mass material. Hydrocarbons to be reacted, supplied to the system through pipe 11 are subjected to the charging stock preparation step indicated at 12, and from 12 flow through pipe 13 into reactor 10. The charging stock preparation step will in general consist in the main of heating the hydrocarbon stock to provide it in vapor form and at reaction temperature for entry to the reaction zone. The heating equipment used may be any of the usual forms of apparatus suitable for this purpose and will usually and preferably include a pipe still form of heater. The stock preparation step, it is also understood, may contain, if necessary, provision for separating from the material flowing through pipe 11 any portion which is not suitable for charge to reactor 10. For example, if a crude oil were charged through 11 and it was desired to pass only gas oil through pipe 13, the stock preparation step would include appropriate fractionating equipment, evaporators, vapor heaters, if necessary, and similar equipment capable of segregating from the charge only that desired portion to be converted and bringing it to the proper temperature for reaction while rejecting other portions of the original charge from the system. Reaction products from reactor 10 will be withdrawn through pipe 14 and passed to appropriate equipment for segregating and recovering products of reaction as indicated at 15. This equipment will normally be comprised of the usual setup of fractionators, gas separators, stabilizers, gas recovery systems and the like, as indicated by the necessities of the conversion in hand and will normally include provision for returning unconverted material or even other reaction products to the reactor for retreatment with or without prior passage through a stock preparation step.

It will be understood that heat exchangers and similar heat recovery arrangement may be applied at any point where necessary or appropriate.

Purge gas is introduced near the lower end of the reactor 10 through pipe 17 in a manner to be shown hereinafter and may be permitted to pass up through the reactor and out with the reaction products. The solid material, substantially free of reactant vapors passes through a valve 19 or any similar device, capable of controlling the rate of passage of solid material, which device, if desired, may be so designed as to assist in the proper isolation of the reaction zone from other portions of the system. The solid then passes into elevator 20. It is therein hoisted and discharged into the top of regenerator 22, to pass therethrough as a moving column. The regeneration is usually a combustion and to effect it, regeneration medium may be introduced at 23 and withdrawn at 24. Inert purge gas may be introduced to the lower section of the regenerator through pipe 26 and removed therefrom through pipe 27 thereby removing regeneration medium to substantially prevent its presence in the reaction chamber 10. Between the regenerator 22 and the reaction chamber 10, there may be provided a valve or other device 28 for the purpose of controlling solid flow, which may assist in the isolation of the reactor or may be arranged to permit of carrying a pressure in the reactor different from that in other portions of the system. Similarly, if desired, a valve or other device 29 may be provided for complete control of similar functions within the regenerator. If necessary, catalyst may be withdrawn from the system as, for example, at 30, or may be added, as, for example at 31, and it is also to be understood that proper provision, if desirable, may be made for the removal of fines from the catalyst circulation system, for holding the external catalyst circulation system under pressure or vacuum or under a blanketing inert gas, and similar provisions.

The reaction carried out in reactor 10 in Figure 1 and the regeneration carried out in regenerator 22 are alike in that they comprise a contacting of a moving particle form solid with a fluid gasiform reactant. As pointed out before, it is advisable and even necessary that uniform contact of reactant and solid be secured and to this end at the bottom of both the regenerator and the reactor, there have been provided structures as discussed in the following figures.

Turning to Figure 2, there is shown here the construction adopted at the bottom of reactor 10. While for convenience in description, only the construction of reactor 10 is discussed, it must be remembered that the problem of uniform downward flow of solid material is the same within the regenerator 22 as it is within the reactor 10 and consequently in all of the following discussion, it must be understood that the description and the remarks made are equally applicable to the regenerator as well as to the reactor. Although the method and apparatus for control of uniform contact material flow through conversion vessels involved herein is the subject of the hereinbefore mentioned Patent No. 2,412,136, the use of a particular form of that method and apparatus with certain new additions is the subject of this invention and for convenience a brief description of the entire embodiment will now be given.

In Figure 2 we find reactor 10 terminating in a generally conically shaped neck 32 leading to a discharge pipe 33 upon which there may be mounted a valve or other control device 34 useful for any of the purposes or all of the purposes indicated for items 19 and 28 in the discussion of Figure 1. Near the lower end of shell 10 is disposed a partition 35 extending horizontally there across and in the conical section 32 are disposed two similar partitions 36 and 37. The partition 35 constitutes the bottom closure of reactor 10 and the partitions 36 and 37 are spaced therebelow as will be described.

In these partitions there are holes and dependently associated therewith conduits 38, 39 and 40 so arranged that the single discharge stream in pipe 33 is fed by a plurality of streams originating in conduits 40, each of which in turn is fed from a plurality of conduits 39 and each of these in turn being fed by a plurality of conduits 38. The vertical spacing of partitions 35, 36 and 37 and the lengths of conduits 38 and 39 are such that the line defining a path of flow between the upper end of any conduit depending from one partition and the lower end of an associated conduit depending from the partition next above should not be less than about 35° with the horizontal. There may be any number of these partitions dependent upon the amount of subdivisions of the single discharge stream 33 necessary to secure uniform flow over all of the cross-sectional area of reactor 10 at a level not substantially removed from the upper partition 35. The conduits depending from any partition should be of sufficient total internal cross-sectional area to allow therethrough the maximum anticipated rate of contact material flow. The arrangement of the conduits in the partition 35 should be such that the quantity of contact material flowing through said conduits is in direct proportion to the area of the contact material column from which each of these conduits draw. The arrangement of the conduits in the succeeding baffles must be such as to draw from the conduits in the partition thereabove the proper proportion of contact material flow.

It becomes clear from the above that the conduits and/or orifices in any given partition need not be of the same cross-sectional size and shape nor need they be evenly spaced apart on said partition. The important factor is that the conduits and/or orifices be of such shape, size and distribution as to provide a contact material volumetric flow distribution from the bottom of the column of contact material which is substantially uniformly distributed across the bottom of said column with respect to the cross-sectional area thereof on the one hand; and for any partition below the uppermost on the other hand, the conduits and/or orifices should be of such shape, size and distribution as to draw a volumetric solid flow from conduits and/or orifices in the partition thereabove in proportion to the volumetric solid flow through said orifices and/or conduits thereabove. Likewise the discharge pipe 33 is placed symmetrically with regards to the flow from the conduits 40 thereabove. It should be understood that in the description of this invention and in the claiming thereof, unless otherwise stated, the above meaning is to be given to the terms "symmetrically located" or "spaced" or equivalents thereof when used in regards to conduits or to the discharge pipe 33.

For practical reasons it is generally convenient to accomplish the above by making the conduits depending from any one partition equal in size and to increase the size of the conduits in each successive partition. Thus usually the whole set-up is such that a large number of comparatively small individual streams substantially equal in size are drawn from points symmetrically and evenly spaced throughout the area of the reactor 10 and these streams are then stepwise and symmetrically combined and re-combined until a single discharge stream is achieved. Thus we find that any control effected by control mechanism 34 upon the rate of flow of solid material is not reflected as a distortion of the equal flow of material through any portion of reactor 10 beginning at a level a relatively short distance above the uppermost partition.

In Figures 3 and 4 are shown typical bottom plan views of the uppermost partition 35 showing two forms of conduit arrangement. In Figure 3, the conduits consist of a plurality of substantially evenly spaced tubes 65 of equal and circular cross-section. In Figure 4, the cross-sectional view of the conduits appears as a number of concentrically disposed circular slots 66. Other shapes and arrangements are possible as above pointed out. Moreover, although the reactor shown is of circular cross-section, the method is equally applicable to reactors of other shapes.

Returning to Figure 2, we find the oppositely placed reactant vapor inlet pipes 40' connected to the shell 10. There may be a number of such pipes and opposite them within a reactor a number of inverted angle topped channels 43 extending across the reactor between inlet pipes and spaced uniformly apart so as to form a row of such channels across the reactor in a direction perpendicular to the plane of the drawing. Hollow sleeves 42 inserted through the shell and under the channels may be used as a means of support thereof and as a means of communication between the channels and the inlet pipes. Spaced below said reactant vapor inlet means is a somewhat similar arrangement consisting of pipes 45, channels 46 and sleeves 47 of which only one of each is shown. In this case the outlet pipes may be connected only on one end of the channels. This second arrangement constitutes the inert purge gas outlet means. Connected through the shell at a location just under the partition 35 is a pipe 48 through which inert gas may be introduced.

It will be noticed that immediatedly below the partition 35 and above the accumulation of contact material 50 and between the plurality of conduits 38, there is left a free space 49. The inlet purge gas from pipe 48 is directed into this space wherein it is free to distribute itself uniformly over the entire reactor shell cross-section. The pressure at this location is maintained slightly higher than that at the channels 43 or 46, so that the purge gas flows upwardly through the conduits 38 into and up through the column of contact material above the partition 35 and then disengages from the contact material at the channels 46 and is withdrawn through sleeves 47 and pipes 45.

The gas flow from the pipe 45 is controlled by the diaphragm operated valve 41 which is actuated by differential pressure controller 44 so that the pressure at the channels 46 is maintained equal to or slightly higher than that at the channels 43 thereby forcing the flow of a small quantity of inert gas upwards through the column of contact material above channels 46 and preventing downward flow of reactant vapor from the channels 43 through the contact material to the outlet channels 46. Thus it can be seen that the uniformly flowing contact material in the column at 51 is purged with a partially used inert purge gas containing some reactant vapors flowing upwardly therethrough at a relatively low uniform rate. Also the contact material from which most of the hydrocarbons have been removed flowing downwardly through the conduits 38 is purged with fresh inert purge gas flowing upwardly therethrough at a relatively high linear velocity. This combination of countercurrent low velocity purge with partially used gas followed by high velocity purge with fresh gas results in a substantial improvement in the efficiency of reactant removal from the contact material over what has been obtainable heretofore, thereby reducing the required length of the column 51. Thus there results a substantial decrease in the length of reactor shell 10 required and of the structural steel required for its support not only as a result of improved purging efficiency but also as a result of elimination of purge gas inlet distribution means that formerly were required in column 51 and the elimination of the necessity for a completely unusable column of contact material between such distribution means and the partition 35.

It should be understood that the reactant vapor inlet means and the purge gas outlet means shown in Figure 1 are purely diagrammatic in character and that several equivalent distribution or collector means may be used. Moreover, in many operations it is convenient to permit the inert purge gas to pass upwardly through the reaction zone and to remove it along with the reaction products. In this event, the purge gas outlet channels and the differential pressure control arrangement may be eliminated resulting in a further simplification and reduction in the cost of the apparatus. It is also immaterial to the operation of this invention whether the channels 43 be used as reactant vapor inlet distribution means or as a reaction product outlet collector means.

The purge vapor may also be introduced under partitions other than the uppermost partition. Such an arrangement is shown in Figure 5 in which is shown a vertical section quite similar to Figure 2, and in which like portions are designated by like numerals. In this arrangement, we find uppermost partion 53 without conduits but with holes or orifices 56 therein. Below are partitions 54 and 55 with conduits 57 and 58 depending therefrom. Inert purge gas is introduced through pipes 48 into the space 59 immediately below the intermediate partition 54 and said gas then passes upwardly through the contact material streams in conduits 57 and upwardly through orifices 56 in partition 53 into the contact material column and upwardly therethrough past the reactant vapor inlet channels 43 into the reaction zone. It is finally withdrawn from the reaction zone along with products of reaction at a location not shown. It will be seen that holes or orifices may be used without conduits in partitions under which no gas is to be introduced.

It becomes apparent that purge gas may be introduced under more than one of said partitions at the same time if desired. Moreover, it is also possible with this apparatus to introduce the purge gas under one of the lower partitions and remove it from the space under one of the partitions thereabove, thereby accomplishing the removal of reactant vapors from the contact material between said two partitions and eliminating the purge gas outlet mechanism above the uppermost partition or the necessity for passing the purge gas through the reaction zone. Such an arrangement is shown in Figure 6 which is a sectional vertical view of the lower end of a reaction vessel somewhat similar to that in Figure 2, like parts bearing like numerals. In Figure 6 it will be noted that the two uppermost partitions 70 and 71 have conduits 73 and 74 respectively dependent therefrom and lowermost partition 72 has properly spaced orifices 75 therein. A purge gas inlet conduit 76 is connected into the vessel just below partition 71 and a purge gas outlet conduit 77 just below partition 70 thereabove. A diaphragm operated flow control valve 78 operated through differential pressure control instrument 79 is provided on conduit 77. This valve acts to control the gaseous pressure under partition 70 slightly above that at the reactant inlet level at conduit 40', thereby preventing escape of reactant gas with the purge gas through conduit 77.

Another use for the method and apparatus of this invention is its use for contact material flow equalization and as a distribution inlet for reactant or contacting vapors themselves. Thus in Figure 5, reactant vapors may be charged to the reactor through pipes 48 and the inlet mechanism 43—40' may be eliminated. In this event the length of discharge pipe 33 between conical section 32 and contact material flow control mechanism 34 should be great enough to permit maintaining a column of contact material therein of sufficient length to prevent substantial flow and loss of the reactant vapor therethrough. In connection with this use of the invention it is also possible to introduce reactant vapors under the uppermost partition and inert purge gases under a lower partition and then pass both reactant and inert gas upwardly through the conversion zone, provided, of course, that conduits are dependent from each of said partitions.

Since the required rate of gas introduction under one or more of the partitions which also serve to control uniform flow of contact mass material in all portions of the reaction zone is dependent in the case of a reactant introduction upon the desirable operating conditions inherent in the specific application and in the case of a purge gas introduction upon the nature of the reactant, purge gas and the contact material, the operating temperature and pressure, the contact material flow rate and other variables characteristic of a given specific application, it is apparent that no set limits for rate of vapor flow for this invention may be given. Moreover, since the size of the apparatus is mainly dependent upon desired capacity, it would be impossible to give set dimensions for the apparatus of this invention.

The following broad specifications may be given:

1. The conduits depending from the partitions may be of any desired length provided sufficient space is allowed for introduction and distribution of inlet gas under said partitions. More satisfactory operation will be obtained, however, if the conduits be of a length at least double their equivalent diameter four times internal cross-sectional area divided by internal perimeter of pipe and if said conduits terminate a sufficient distance above the partition below to provide an accumulation of contact material on said partition of a minimum depth of about four inches. Moreover, operation may be obtained without the use of conduits dependent from partitions under which there is no gas inlet or outlet or satisfactory operation may be obtained by use of conduits from all partitions.

2. The distance between the inlet to the single contact material discharge pipe and the throttling mechanism therein should be such as to provide a height of contact material column therein which will reasonably limit the flow of inert gas therethrough (when an inert gas is introduced under the partitions) and which will substantially prevent the flow of reactant vapor therethrough (when reactant vapors alone are introduced under the partitions).

3. The rate of vapor introduction under the partitions should be below an upper limit which would seriously interfere with the flow of contact material downward through the conduits dependent from said partitions.

It should be understood that the term reactant vapor and reaction zone have been used for purpose of example only and that the method and operation of this invention would be the same whether the so-called reactant vapor entered into a so-called cracking conversion, a reaction with a deposit on the contact mass or was used for some other purpose not involving reaction at all. It is not intended, therefore, that the invention be limited by the use of this exemplary term.

It should be also understood that all the foregoing illustrations of the method and apparatus of this invention and the use thereof are intended merely as illustrative and are in no way intended to limit the scope of this invention except as limited in the following claims.

We claim:

1. A method for effecting uniform contacting between a gas and a particle-form solid contact material flowing as a moving bed through a contacting zone to a discharge zone of lesser cross-sectional area which comprises: maintaining a bed of downwardly moving contact material within said contacting zone; replenishing said bed at the top thereof; flowing the contact material from the bottom of said contacting zone as a subdivided moving bed uniformly distributed over the cross-sectional area of said contacting zone and having a cumulative horizontal cross-sectional area less than that of the bed in said contacting zone; introducing gas into said subdivisions and passing it upwardly therethrough into said bed in said contacting zone; passing said gas through at least a portion of said bed of contact material, and withdrawing gas from said bed; recombining said subdivisions in a plurality of horizontal stages, each recombination involving a reduction in the number of subdivisions in the absence of any further division of the original subdivisions; and finally merging the resulting subdivisions into a continuous, moving substantially compact discharge stream in said discharge zone while maintaining continuity of solid material column from said discharge stream through said subdivisions to said contacting zone thereabove.

2. A method for contacting gases with a moving bed of particle form solid contact mass material with substantially uniform downward flow of all portions of the contact mass material bed and with uniform flow distribution of a gas adjacent the lower end of said bed, comprising: maintaining a bed of downwardly moving contact mass material, replenishing said bed at the top thereof, conducting particle form contact mass material from the bottom of said bed to an accumulation of said contact material below in a plurality of streams from a plurality of locations, distributed across said bed, said streams being of such size and arrangement that the total horizontal cross-sectional area of said streams is substantially less than that of said bed and that the stream horizontal cross-sectional area per unit of bed cross-sectional area is substantially uniformly distributed across the bottom of said bed and the linear dimensions of any of said streams in any horizontal direction being substantially less than the corresponding linear horizontal dimension of said bed, similarly withdrawing contact material from the bottom of said accumulation of contact material in a smaller number of streams and combining said streams to form a single symmetrically placed discharge stream; and at the same time introducing a gas to the space above said accumulation of contact mass material and between said first mentioned streams, said space being substantially free of contact material, passing said gas from said space into said first mentioned streams and upwards therethrough into said bed of flowing contact material, passing said gas through at least a portion of said bed of contact material and withdrawing gas from said bed.

3. A method for the conversion of hydrocarbons in the presence of a moving particle form solid contact material with substantially equal exposure of all portions of the contact mass material to said hydrocarbons and with substantially uniform distribution of inlet hydrocarbon vapors thereto, comprising: maintaining a substantially compact column of downwardly moving particle form contact material; continuously replenishing said column at the top thereof; continuously conducting contact material from the bottom of said bed to an accumulation of contact material below in a plurality of streams from a plurality of points distributed over the cross-section of said column, the streams being of less total cross-sectional area than said column and said streams being of such size and arrangement as to provide a substantially uniform stream cross-sectional area per unit of column cross-sectional area substantially entirely across the bottom of said column; similarly withdrawing contact material from the bottom of said accumulation of contact material in a smaller number of streams and combining said streams to form a single symmetrically positioned discharge stream; controlling the continuous flow of contact material from said discharge stream to govern the flow of contact material in said column, said discharge stream being of sufficient length to prevent the substantial flow of hydrocarbons therethrough; continuously introducing hydrocarbon vapors at conversion conditions of temperature and pressure to a space above said accumulation of contact material and between said first mentioned plurality of streams; continuously flowing hydrocarbons from said space into said streams and upwards therethrough into said column of contact material, continuously flowing said hydrocarbon vapors upwards through said column and continuously withdrawing conversion products therefrom.

4. A method for contacting vapors with moving particle form solid contact mass material comprising the following steps: continuously flowing contact mass material downwardly through a contacting zone in the form of a substantially compact column; continuously replenishing said column at the top thereof; continuously introducing contacting vapors to said column; continuously flowing said vapors through said column and withdrawing vapors therefrom; continuously conducting contact material from the bottom of said column to an accumulation of contact material below in a plurality of streams from a plurality of locations, said streams being restricted in every horizontal dimension substantially below the corresponding horizontal dimension of the bottom of said column and being distributed so that the stream cross-sectional area per unit of column cross-sectional area is substantially uniform across the bottom of said column similarly flowing contact material from the bottom of said accumulation of contact material in a smaller number of larger streams and combining said streams to form a single discharge stream; continuously withdrawing contact material at a controlled rate from said discharge stream; continuously introducing an inert purge vapor to a single, continuous space located above said accumulation of contact material and between said first mentioned streams, said space being substantially free of contact material; continuously flowing said inert vapor from said space into said first mentioned streams and upwards therethrough into the bottom of said column of flowing contact material; continuously flowing said inert vapor upwardly through said column and finally withdrawing said inert vapor from said column.

5. A method for contacting vapors with moving particle form solid contact mass material comprising the following steps: continuously flowing contact mass material downwardly through a contacting zone in the form of a substantially compact column; continuously replenishing said column at the top thereof; continuously introducing contacting vapors to said column; continuously flowing said vapors through said column and withdrawing vapors therefrom; continuously conducting contact material from the bottom of said column to an accumulation of contact material below in a plurality of streams from a plurality of locations, said streams being of such size and distribution across the bottom of said column as to provide substantially uniform stream cross-sectional area per unit of column cross-sectional area substantially entirely across the bottom of said column, withdrawing a smaller number of larger streams of said solid material from said accumulation, said last named streams being horizontally staggered between said first named streams thereabove, so as to receive flow of solid therefrom proportionate to the cross-sectional areas thereof, and combining said streams to form a single discharge stream; continuously withdrawing contact material at a controlled rate from said discharge stream; continuously introducing an inert purge vapor to the space above said accumulation of contact material and between said first mentioned streams, said space being substantially free of contact material; continuously flowing said inert vapor from said space into said first mentioned streams and upwards therethrough into the bottom of said column of flowing contact material; continuously flowing said inert vapor upwardly through a portion of said column adjacent the lower end thereof; continuously withdrawing said inert vapor from a location in the lower section of said column below the vapor contacting zone while maintaining the pressure at said inert vapor withdrawal zone at least equal to that in the lowest section of said vapor contacting zone.

6. A method for contacting vapors with a moving bed of particle form solid contact mass material with substantially equal exposure of all portions of the contact mass material and with uniform vapor inlet distribution adjacent the lower end of said bed, comprising maintaining a downwardly moving bed of said contact mass material, replenishing said bed at the top thereof, conducting particle form contact mass material from the bottom of said bed in a plurality of streams from a plurality of points, and flowing it onto the first of a series of accumulations of particle form contact material located below said bed, said streams being uniformly distributed over the entire cross-sectional area of the bottom of said bed so that the stream cross-sectional area per unit of bed cross-sectional area is substantially uniform across the bottom of said bed and each of said streams being limited in its maximum horizontal dimension to only a minor fraction of the corresponding horizontal dimension of the bottom of said bed so that the total horizontal cross-sectional area of said stream is substantially less than that of said bed, similarly withdrawing from the bottom of each of said accumulations, serially, a smaller number of streams of contact material, and finally reducing the number of streams to a symmetrically placed single discharge stream; and at the same time introducing vapor to a space above at least one of said accumulations of contact material and between the contact material streams flowing thereto, said space being substantially free of contact material, passing said vapor from said space into the adjacent streams of contact material and upwards therethrough, passing the vapor upwards through those of said series of contact material accumulations and plurality of streams flowing thereto intervening between said inlet space and said bed of contact material, passing said vapor through at least a portion of said bed, and withdrawing vapor therefrom.

7. In a process of the type described a method for contacting gases with a moving bed of particle form solid material comprising: maintaining a downwardly moving bed of said solid material; replenishing said bed at the top thereof, conducting solid material from the bottom of said bed in a plurality of confined streams from a plurality of points, and flowing it onto the first of a series of accumulations of said solid located below said bed; said streams being distributed in such a way that the stream cross-sectional area per unit of bed cross-sectional area is substantially uniform substantially entirely across the bottom of said bed and said streams being of less total cross-sectional area than said bed similarly withdrawing from the bottom of each of said accumulations, serially, a smaller number of larger streams of said solid, the streams from each accumulation being horizontally staggered proportionately as regards cross-sectional area with respect to the streams thereabove, and finally reducing the number of streams to a single discharge stream; and at the same time introducing a gas to the space above the uppermost of said accumulations of said solid and between said streams flowing thereto, said space being substantially free of said solid material, passing said gas from said space into said streams and upwards therethrough into said bed of solid material, passing said gas through at least a portion of said bed and withdrawing gas from said bed.

8. In a process of the type described a method for contacting reactant hydrocarbon vapors with moving particle form contact mass material comprising: flowing particle form contact mass material through a reaction zone in the form of a substantially compact column of contact material, replenishing said column near the top thereof, introducing hydrocarbon vapors to said column, flowing said vapors through said column, withdrawing vapors from said column, conducting contact material from the bottom of said column in a plurality of streams from a plurality of points, and flowing it onto the first of a series of accumulations of contact material located below said column, said streams being uniformly distributed across the cross-sectional area of the bottom of said column and any of said streams measuring in any horizontal dimension only a minor fraction of the corresponding horizontal dimension of said column, similarly withdrawing from the bottom of each of said accumulations, serially, a smaller number of larger streams of contact material and finally reducing the number of streams to a single symmetrically located discharge stream, withdrawing contact material from said discharge stream at a controlled rate; and at the same time introducing an inert purge vapor to the space above the uppermost of said accumulations of contact material and between said contact material streams flowing thereto, said space being substantially free of contact mass material, passing said inert vapor from said space into the adjacent streams of contact mass material and upwards therethrough into the bottom of said column of flowing contact material, passing said inert vapor up through a lower section of said column and finally withdrawing said inert vapor from a location adjacent the lower section of said column below the hydrocarbon reaction zone while maintaining the pressure at said inert vapor withdrawal location at least equal to that of the lowest section of said reaction zone.

9. In a process of the type described a method for contacting reactant hydrocarbon vapors with moving particle form contact mass material comprising: flowing particle form contact mass material through a reaction zone in the form of a substantially compact column of contact material, replenishing said column near the top thereof, introducing hydrocarbon vapors to said column, flowing said vapors through said column, withdrawing vapors from said column, conducting contact material from the bottom of said column in a plurality of streams from a plurality of points, and flowing it onto the first of a series of accumulations of contact material located below said column, said streams being distributed over the entire horizontal cross-section of the bottom of said column and being of less total cross-section than said column and being of such size and arrangement as to provide substantially uniform stream cross-sectional area per unit of column cross-sectional area substantially entirely across the bottom of said column, similarly withdrawing from the bottom of each of said accumulations, serially, a smaller number of larger streams of contact material and the streams from each accumulation being horizontally staggered proportionately as regards cross-sectional area between the streams directly thereabove, finally reducing the number of streams to a single symmetrically located discharge stream, withdrawing contact material from said discharge stream at a controlled rate; and at the same time introducing an inert purge vapor to the space above the uppermost of said accumulations of contact material and between said contact material streams flowing thereto, said space being substantially free of contact mass material, passing said inert vapor from said space into the adjacent streams of contact mass material and upwards therethrough into the bottom of said column of flowing contact material, flowing said inert vapor upwardly through said column of contact material, and finally withdrawing said inert vapor from said column.

10. In a process of the type described a method of contacting hydrocarbon vapors with moving particle from contact mass material comprising the following steps: continuously flowing particle form contact mass material downwardly through a reaction zone in the form of a substantially compact column while replenishing said column at the top thereof with contact material; continuously introducing hydrocarbon vapors into said column; continuously flowing hydrocarbon vapors through said column; continuously withdrawing hydrocarbon vapors from said column; continuously conducting contact material from the bottom of said column in a plurality of streams from a plurality of points, and flowing said contact material onto the first of a series of accumulations of contact material located below said column; said streams being of total cross-sectional area less than that of said bed, and being of such size and arrangement as to provide a substantially uniform stream cross-sectional area per unit of bed cross-sectional area substantially entirely across the bottom of said bed, similarly withdrawing from the bottom of each of said accumulations, serially, a smaller number of larger streams of contact material and finally reducing the number of streams to a single symmetrically located discharge stream; withdrawing contact material from said discharge stream at a controlled rate; continuously introducing inert purge gases to a space above at least one of said accumulations of contact material below said uppermost accumulation and between the streams of contact material flowing thereto; flowing said inert gases from said space into and upwardly through said streams; withdrawing said inert gases from the space above said uppermost accumulation of contact material and below said column of contact material.

11. An apparatus for contacting gases with particle form solid material comprising: a vessel laterally confining a substantially compact bed of downwardly flowing particle form solid material; means to introduce said solid near the top of said vessel; a plurality of superposed horizontally extending partitions spaced apart in the lower section of said vessel, said partitions dividing the lower section of said vessel into a series of superimposed chambers of substantially less height than the remainder of said vessel thereabove, the uppermost of said partitions having a plurality of holes therethrough, said holes being of such size and distribution across said uppermost partition as to provide a hole cross-sectional area per unit of partition cross-sectional area which is substantially uniform entirely across said partition, and each of said succeeding partitions below having a gradually decreasing number of holes, said holes in said succeeding partitions being horizontally staggered between the holes in the partition thereabove in such a manner as to receive proportionate flow of solid from said holes thereabove a solid material discharge duct connected to said vessel below the lowermost of said partitions, the inlet thereof being symmetrically placed with regards to the cross-sectional distribution of the holes in said lowermost partition; a flow control means on said discharge duct; conduits open at their ends dependently associated with each of the holes through at least one of said partitions, said conduits terminating short of the partition below; a vapor flow conduit connected into said vessel at at least one location below at least one of said partitions having depending conduits and above the lower extremity of said depending conduits; a vapor flow conduit connected to said vessel near the upper end thereof.

12. In a reactor for contacting vapors with a moving bed of particle form contact mass material with substantially equal exposure of all portions of the contact mass material and with substantially uniform flow distribution of a vapor adjacent the lower end of said bed; a means laterally confining a substantially compact bed of downwardly flowing particle form contact mass material; a contact material supply duct to said confining means; means to supply contact material to said supply duct; in the lower section of said confining means a plurality of superposed, substantially horizontally extending, spaced partitions, said partitions dividing the lower section of said confining means into a series of superimposed chambers of substantially less height than the section of said confining means thereabove, the uppermost of said partitions having a plurality of holes therein, said holes being so distributed and proportioned as to provide substantially uniform volumetric flow of solid material from the bottom of said confined column, and each succeeding partition below having a gradually decreasing number of holes therein, said holes in said succeeding partitions being in such horizontal staggered relation to the holes in the partition directly thereabove as to receive solid flow therefrom in proportion to their areas of cross-section; a contact material discharge duct connected to said confining means below the lowermost of said partitions, the inlet to said discharge duct being symmetrically placed with regard to said holes in said lowermost partition; conduits open at their ends, dependently associated with each of the holes through at least one of said partitions, said conduits terminating short of the partition below; a vapor flow conduit connected into said confining means at at least one location below at least one of said partitions from which conduits depend and above the lower extremity of the conduits dependent therefrom; a vapor flow conduit connected to said vessel near the upper end thereof.

13. In an apparatus of the type described, a vessel laterally confining a substantially compact bed of downwardly flowing particle form solid material; means to supply said solid near the top of said vessel; a plurality of superposed horizontally extending partitions spaced apart in the lower section of said vessel, said partitions dividing said lower section of said vessel into a series of superimposed chambers of substantially less height than the remainder of said vessel thereabove, the uppermost of said partitions having a plurality of holes therethrough distributed over its horizontal cross-section, said holes being of such size and arrangement as to provide substantially uniform aperture cross-sectional area per unit of partition cross-sectional area substantially entirely across said partition, and the succeeding partitions therebelow having a gradually decreasing number of larger holes therethrough, said holes in said succeeding partitions being in such horizontally staggered relation to the holes in the partition directly thereabove as to receive solid flow therefrom in proportion to their areas of cross-section; a solid material discharge duct connected to said vessel below the lowermost of said partitions, the inlet thereof being symmetrically placed with regards to said holes in said lowermost partition; a flow control means to govern flow of solid through said vessel on said discharge duct; conduits open at their ends dependently associated with each of the holes through at least one of said partitions, said conduits terminating short of the partition below; a vapor flow conduit connected to said vessel at at least one location below at least one of said partitions from which conduits depend and above the lower extremity of said depending conduits; a vapor flow conduit connected to the lower section of said vessel at a location somewhat above said uppermost partition; a vapor flow conduit connected near the top of said vessel, and within said vessel vapor handling means associated with that vapor flow conduit entering the lower section of said vessel.

14. In an apparatus of the type described, a vessel laterally confining a substantially compact column of downwardly flowing particle form contact mass material; a contact material inlet duct near the top of said vessel; means to continuously supply contact material to said duct; a plurality of superposed horizontally extending partitions spaced apart in the lower section of said vessel, said partitions dividing said lower section of said vessel into a series of superimposed chambers of substantially less height than the remainder of said vessel thereabove, the uppermost of said partitions having a plurality of holes therethrough, said holes being of such size and distribution across said partition as to provide an aperture area per unit of partition cross-sectional area which is substantially uniform across the partition horizontal cross-section, and the cross-sectional area of said holes being less than that of said vessel, and the succeeding partitions having a gradually decreasing number of holes therethrough, said holes in said succeeding partitions being in such horizontally staggered relation to the holes in the partition directly thereabove as to receive solid flow therefrom in proportion to their areas of cross-section; a solid material discharge duct connected to said vessel below the lowermost of said partitions, the inlet thereof being symmetrically placed with regard to said holes in said lowermost partition; a flow control means on said duct to govern flow of solids through said vessel and to provide in said duct a substantially compact column of contact material of sufficient length to substantially prevent flow of gas therethrough; conduits open at their ends dependently associated with each of the holes in at least the uppermost of said partitions, said conduits terminating short of the partition below and being of equal length, said length being greater than twice the equivalent internal diameter of any of said conduits; a gas inlet duct connected to said vessel at a location below said uppermost partition and above the lower extremity of said conduits; means to introduce and distribute hydrocarbon gases to the lower section of said vessel at a location above said uppermost partition; means to disengage inert gases from within said vessel at a location between said hydrocarbon inlet means and said uppermost partition, said hydrocarbon inlet means and said inert gas disengaging means being so spaced within the vessel as to allow a substantial column of contact material therebetween; means to withdraw gases from said disengaging means; means to control the gaseous pressure at said disengaging means slightly greater than the gaseous pressure at said inlet means; means to withdraw gaseous reaction products from said vessel near the top thereof.

15. In a reactor for contacting vapors with a moving bed of particle form solid material with substantially equal exposure of all portions of the solid material and with substantially uniform inlet distribution of a vapor adjacent the lower end of said bed; a cylindrical vessel laterally confining a substantially compact bed of downwardly flowing particle form solid material; a solid material supply duct connected to said cylindrical vessel; means to supply solid material to said supply duct; in the lower section of said vessel a plurality of superposed, transversely extending, spaced partitions, said partitions dividing said lower section of said vessel into a series of superimposed chambers of substantially less height than the remainder of said vessel thereabove, the uppermost of said partitions having a plurality of holes therethrough, the cross-section of said holes being less than that of said vessel and said holes being further of such size and arrangement as to provide substantially uniformly distributed aperture area per unit of partition horizontal cross-section entirely across said uppermost partition, and each succeeding partition therebelow having a gradually decreasing number of holes therethrough, said holes in said succeeding partitions being in such horizontally staggered relation with respect to the holes in the partition directly thereabove as to draw solid flow therefrom in proportion to their areas; a solid material discharge duct connected to said vessel below the lowermost of said partitions, the inlet to said discharge duct being symmetrically placed with regard to said holes in said lowermost partition; a flow control means to govern flow of said solid material through said vessel; conduits open at their ends associated with each of the holes through each of said partitions, one of said conduits being tightly fitted substantially vertically within each hole, the conduits associated with any given partition terminating at a common level on their open upper ends and terminating at a lower common level on their lower ends which lower level is short of the partition therebelow; a vapor flow conduit connected into said vessel at at least one location below at least one of said partitions and above the lower extremity of the conduits dependent therefrom; a vapor flow conduit connected into said vessel at a location adjacent the upper end thereof.

16. In an apparatus of the type described, a vessel laterally confining a substantially compact column of downwardly flowing particle form contact mass material; a contact material inlet duct near the top of said vessel; means to continuously supply contact material to said duct; a plurality of superposed horizontally extending partitions spaced apart in the lower section of said vessel, said partitions dividing said lower section of said vessel into a series of superimposed chambers of substantially less height than that of said vessel above the uppermost partition, the uppermost of said partitions having a plurality of holes therethrough, said holes being of such size and distribution as to provide substantially uniform aperture area per unit of partition area substantially entirely across said partition, and the total cross-sectional area of said holes being less than that of said vessel, and the succeeding partitions below the uppermost partitions having a decreasing number of holes therethrough, said holes in said succeeding partitions being in such horizontally staggered relation to the holes in the partition directly thereabove as to receive solid flow therefrom in proportion to their areas of cross-section; a solid material discharge duct connected to said vessel below the lowermost of said partitions, the inlet thereof being symmetrically placed with regard to said holes in said lowermost partition; a flow control means on said duct to govern flow of solids through said vessel and to provide in said duct a substantially compact column of contact material of sufficient length to substantially prevent flow of gas therethrough; conduits open at their ends dependently associated with each of the holes in all of said partitions excepting the lowermost partition, said conduits in said partitions terminating short of the partition immediately therebelow, and the conduits in any partition being of equal length, said length being greater than twice the equivalent internal diameter of said conduits; a gas inlet conduit connected into said vessel at at least one location below one of the intermediate partitions and above the lower extremity of the conduits dependent therefrom; a gas outlet conduit connected into said vessel at at least one location below the uppermost partition and above the lower extremity of the conduits dependent therefrom; a gas flow conduit connected into said vessel at a location sufficiently above said uppermost partition to allow for a substantial column of contact material within said vessel therebetween; means to control the gaseous pressure immediately below said upper partition at least equal to that at said gas flow conduit thereabove; a gas flow conduit connected into said vessel adjacent the upper end thereof.

17. A method for contacting gases with a moving bed of particle form solid contact mass material with substantially uniform downward flow of all portions of the contact mass material bed and with uniform flow distribution of a gas adjacent the lower end of said bed, comprising: maintaining a bed of downwardly moving contact mass material, replenishing said bed at the top thereof, conducting particle form contact mass material from the bottom of said bed to an accumulation of said contact material below in a plurality of substantially equal small confined streams of circular cross-section from a plurality of points substantially uniformly distributed across the cross-section of said bed, said streams being distributed in such a way that the stream cross-sectional area per unit of bed cross-sectional area is substantially uniform substantially entirely across the bottom of said bed and said streams being of substantially less total cross-sectional area than said bed, withdrawing contact material from the bottom of said accumulation in a smaller number of substantially equal streams, said streams being drawn from a smaller number of points uniformly horizontally staggered with respect to the streams thereabove, and combining said streams to form a single symmetrically placed discharge stream; and simultaneously introducing a gas at a location above said accumulation and between said first named streams, flowing said gas into and up through said first named streams into said bed of contact material thereabove, flowing said gas through at least a portion of said bed, and withdrawing gas from said bed.

18. A method for conducting gasiphase reactions in the presence of a column of a particle form solid contact mass material with substantially equal exposure of all portions of the contact mass material and with uniform flow distribution of a gas adjacent the lower end of said column, which method comprises: maintaining a moving column of said solid material, replenishing said column at its upper end, conducting particle form solid material from the bottom of said column in a plurality of substantially equal streams from a plurality of points, uniformly distributed across the horizontal cross-section of the bottom of said column, and flowing it onto the first of a series of accumulations of particle form solid material below said column, similarly withdrawing from the bottom of each of said accumulations, serially a smaller number of larger streams of solid material, the streams from any given accumulation being substantially equal and horizontally staggered with respect to those streams flowing onto said accumulation, finally reducing the number of streams to a symmetrically positioned single discharge stream; and at the same time passing gasiphase reactant through said column above said accumulations and introducing a substantially inert purge gas to a solid-free space above at least one of said accumulations between the solid material streams flowing thereto, passing said gas from said space into the adjacent streams of solid material and upwardly therethrough, further passing said gas upwardly through those of said series of solid material accumulations and plurality of streams flowing thereto intervening between said inlet space and said column of solid material, passing said purge gas through at least a portion of said column and withdrawing it therefrom.

19. A method for conversion of hydrocarbons which comprises: maintaining a substantially compact, confined column of particle form solid contact mass material, replenishing said column with solid material at its upper end, withdrawing said solid material from the bottom of said column in a plurality of equal streams from a plurality of spaced points, said streams being of such size and arrangement to provide substantially uniform stream cross-sectional area per unit of column cross-sectional area across the bottom of said column, flowing said streams onto the first of a series of accumulations of said solid material located below; withdrawing solid material from the bottom of each of said accumulations, serially, in a consecutively decreasing number of streams, said streams from any accumulation being equal and horizontally staggered proportionately as regards cross-sectional areas with respect to the streams directly thereabove, finally reducing the number of streams to a single symmetrically positioned discharge stream, throttling the rate of solid flow in said discharge stream, passing hydrocarbon vapors through said column above said accumulations, introducing an inert purge gas into the space between the plurality of streams flowing onto one of said intermediate accumulations, passing said gas into said streams and upwardly therethrough, continuing said gas flow upwardly through any intervening accumulations and plurality of streams below said streams flowing onto said uppermost accumulation, withdrawing said gas from the space between said last named streams and controlling the gaseous pressure at said location of withdrawal above that in said column thereabove.

20. An apparatus according to claim 11 characterized in that said holes in any given partition are equal.

21. An apparatus for conducting gasiphase reactant conversion in the presence of a moving contact mass material which apparatus comprises, a vessel laterally confining a substantially compact column of downwardly flowing particle form solid material, means to pass gasiphase reactants through said column to effect the conversion thereof, means to introduce particle form solid to the upper end of said vessel, a plurality of superposed horizontally extending partitions spaced apart in the lower section of said vessel to divide it into a series of superimposed chambers; the uppermost of said partitions having a plurality of substantially equal orifices distributed uniformly across its horizontal cross-section and the succeeding partitions therebelow having a gradually decreasing number of consecutively larger orifices therethrough, the orifices in any one of said succeeding partitions being equal in size and substantially uniformly horizontally staggered with relation to the orifices in the partition directly thereabove, a solid material discharge duct connected to said vessel below the lowermost of said partitions, the inlet to said duct being symmetrically placed with regards to said orifices in said lowermost partition, flow throttling means on said discharge duct, conduits, open at their ends dependently associated with each of the holes through at least one of said partitions, said conduits terminating short of the partition below, a vapor flow conduit connected to said vessel at at least one level below at least one of said partitions from which conduits depend and above the lower extremity of said depending conduits.

LOUIS P. EVANS.
    CHARLES V. HORNBERG.
    FREDERICK E. RAY.

REFERENCES CITED

The following references are of record in the file of this patent:

UNITED STATES PATENTS

| Number | Name | Date |
|---|---|---|
| 2,239,801 | Voorhees | Apr. 29, 1941 |
| 504,320 | Borgarelli | Sept. 5, 1893 |
| 558,508 | Metcalf | Apr. 21, 1896 |
| 1,623,553 | Randolph | Apr. 5, 1927 |
| 1,782,823 | Hechenbleikner | Nov. 25, 1930 |

FOREIGN PATENTS

| Number | Country | Date |
|---|---|---|
| 543,838 | Great Britain | Mar. 16, 1942 |
| 240,533 | Great Britain | Oct. 1, 1925 |

OTHER REFERENCES

Simpson et al., "The Oil and Gas Journal," of Nov. 12, 1942, pages 96, 99, 100, 102 and 104. (Copy in Scientific Library.)

"National Petroleum News," Dec. 1, 1943, pages R–563, 564 and 566 and 567. (Article by Simpson et al.) (Copy in Div. 31.)